(12) United States Patent
Kenney et al.

(10) Patent No.: US 11,627,052 B2
(45) Date of Patent: Apr. 11, 2023

(54) COMMUNICATIONS SYSTEM RECONFIGURABLE TO DIFFERENT TOPOLOGIES AND ASSOCIATED METHODS

(71) Applicant: L3HARRIS TECHNOLOGIES, INC., Melbourne, FL (US)

(72) Inventors: Brent A. Kenney, Bountiful, UT (US); Brian J. Thorp, Sandy, UT (US); Matthew J. Reimann, Draper, UT (US); Jeffrey B. Bench, Lehi, UT (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 0 days.

(21) Appl. No.: 17/305,392

(22) Filed: Jul. 7, 2021

(65) Prior Publication Data
US 2023/0011036 A1    Jan. 12, 2023

(51) Int. Cl.
*H04L 41/12* (2022.01)
*H04L 43/08* (2022.01)
(Continued)

(52) U.S. Cl.
CPC ............. *H04L 41/12* (2013.01); *H04L 43/08* (2013.01); *H04L 45/02* (2013.01); *H04W 40/248* (2013.01); *H04W 84/18* (2013.01)

(58) Field of Classification Search
CPC ......... H04L 41/12; H04L 43/08; H04L 45/02; H04W 40/248; H04W 84/18
See application file for complete search history.

(56) References Cited

U.S. PATENT DOCUMENTS

| 6,728,214 B1* | 4/2004 | Hao ...................... H04L 43/50 370/254 |
| 10,181,972 B1 | 1/2019 | Giallorenzi et al. |

(Continued)

FOREIGN PATENT DOCUMENTS

WO    2013158591    10/2013

OTHER PUBLICATIONS

H. Tan and W. Seah; "Dynamic Topology Control to Reduce Interference in MANETs," Proc. of Second International Conference on Mobile Computing and Ubiquitous Networking, 2005, pp. 1-7.
(Continued)

*Primary Examiner* — Padma Mundur
(74) *Attorney, Agent, or Firm* — Allen, Dyer, Doppelt + Gilchrist, P.A. Attorneys at Law

(57) ABSTRACT

A communications system may include mobile communications nodes operating according to a current topology and reconfigurable to a new topology. Each mobile communications node may include a wireless transceiver, and a controller configured to transmit spectral performance data to adjacent nodes and receive spectral performance data from the adjacent nodes. The controller may identify potential topologies for the adjacent nodes based on the spectral performance data, select a subset of potential topologies from among the potential topologies, generate a respective performance score for each potential topology of the subset of potential topologies, and switch to a new topology from among the subset of potential topologies based upon the performance scores.

21 Claims, 7 Drawing Sheets

(51) Int. Cl.
*H04L 45/02* (2022.01)
*H04W 40/24* (2009.01)
*H04W 84/18* (2009.01)

(56) References Cited

U.S. PATENT DOCUMENTS

| | | | |
|---|---|---|---|
| 10,356,843 | B1 | 7/2019 | Zarubica et al. |
| 10,652,806 | B1 | 5/2020 | Hirz et al. |
| 10,834,020 | B1 | 11/2020 | Reimann et al. |
| 2006/0133404 | A1* | 6/2006 | Zuniga ............... H04W 72/0446 370/465 |
| 2009/0059814 | A1* | 3/2009 | Nixon ..................... H04L 41/22 370/254 |
| 2014/0036702 | A1 | 2/2014 | Wyk et al. |
| 2014/0075002 | A1* | 3/2014 | Pradhan ................ H04L 67/306 709/223 |
| 2016/0191370 | A1 | 6/2016 | Wood |
| 2019/0260451 | A1* | 8/2019 | Sarkis ................... H04L 1/0026 |
| 2022/0167253 | A1* | 5/2022 | Gramacho ............ H04W 48/20 |

OTHER PUBLICATIONS

R. Ramanathan and R. Rosales-Hain, "Topology Control of Multihop Wireless Networks using Transmit Power Adjustment," Proceedings of the IEEE Conference on Computer Communications (INFOCOM2000), Mar. 2000, pp. 404-413.

X. Jia, D. Li and D. Du, "QoS Topology Control in Ad Hoc Wireless Networks," Proceedings of the IEEE Conference on Computer Communications (INFOCOM2004), Mar. 2004, pp. 1-9.

L. Kleinrock and J. Silvester, "Optimum Transmission Radii for Packet Radio Networks or Why Six is a Magic Number," Proceedings of the IEEE National Telecommunications Conference, Birmingham, Alabama, Dec. 1978, pp. 1-5.

Zhao Chun-xiao and Wang Guang-xing, "Topology Management in Dense MANET," 2004 IEEE 15th International Symposium on Personal, Indoor and Mobile Radio Communications (IEEE Cat. No.04TH8754), Barcelona, 2004, pp. 1027-1031.

Nikaein, N., Bonnet, C., "Topology Management for Improving Routing and Network Performances in Mobile Ad Hoc Networks," Mobile Networks and Applications Sep. 2004, pp. 1-11.

Barcelos et al., "Vehicle Monitoring System Using IEEE 802.11P Device and Android Applications", IEEE Symposium On Computers and Communications, Jun. 2014, pp. 1-7.

Tang, "Distributed Multiuser Scheduling for Improving Throughput of Wireless LAN", IEEE Transactions On Wireless Communications, vol. 13, No. 5, May 2014, pp. 2770-2781.

Wu et al., Batch-Assisted Verification Scheme for Reducing Message Verification Delay of the Vehicular Ad Hoc Networks, IEEE Internet of Things Journal, vol. 7, No. 9, Sep. 2020, pp. 3144-8156.

* cited by examiner

COMMUNICATIONS SYSTEM RECONFIGURABLE TO DIFFERENT TOPOLOGIES AND ASSOCIATED METHODS

FIELD OF THE INVENTION

The present invention relates to communications systems, and, more particularly, to a communications system having mobile communications nodes that are reconfigurable to different topologies and related methods.

BACKGROUND OF THE INVENTION

Wireless networks have experienced increased development in the past decades. One of the most rapidly developing areas is mesh networks, such as a mobile ad hoc network. Physically, mesh networks include a number of geographically-distributed, mobile communications nodes that are wirelessly connected by one or more radio frequency channels. Compared with other types of networks, such as cellular networks or satellite networks, the more distinctive feature of these communication systems is the lack of any fixed infrastructure. The mesh network may be created on-the-fly as the mobile communications nodes transmit to or receive from other nodes, and different nodes join or disconnect, thus reconfiguring the topology of the network. Mobility can vary from zero distance units per time unit to whatever the upper bound may be placed on the nodes. These networks do not generally depend on a particular node to function as a master or controller node, and the network dynamically adjusts as some nodes join and other nodes leave the network, thus forming a new topology when one node leaves or another node joins.

In an environment where a fixed communication infrastructure is unreliable or unavailable, for example, in a natural disaster area struck by an earthquake or hurricane, these networks may be quickly deployed and provide much needed communications. While accommodating the requirements of a hostile environment or emergency situation may be a driving force behind the development of these networks, these types of communications systems are finding new applications in civilian and commercial areas, allowing people to exchange data in the field or even in a confined setting, such as a classroom, without using any network infrastructure except the mesh network they create by turning on their computers or mobile communications devices.

Selecting the neighboring mobile communications nodes in a decentralized mobile ad hoc network is a complicated task. When the network operates with frequency agility, the complexity factor increases since the network may operate with different communications channels at different frequencies. For example, the communications system may operate using a frequency division duplexing (FDD) protocol, allowing uplink and downlink transmissions at the same time, but over different frequency bands. The network thus has frequency agility, but it also has an increased complexity, making the selection of neighboring nodes more complicated. The search space for potential mobile communications nodes in a given topology will grow significantly when the different frequencies are taken into account, especially in a dense network where there are numerous potential neighboring nodes. In a complicated network having the potential of many neighboring nodes, it is desirable if the search space can be limited and the network reconfigured to a new topology, but still find an optimum new topology in the process.

Some current communication systems operating as mesh networks employ different metrics having associated weights to evaluate a current topology to determine if the topology should be changed. The metrics can be added or removed and their different weights may be adjusted. One current communications system operating as a mesh network applies different combinations of metrics such that valid topologies include all nodes that have a higher potential rate than the worst node in a set. This limits the number of valid topologies and helps with reciprocity, but that system may not find an optimum new topology in an acceptable period of time, or may require excessive bandwidth and data processing at different nodes within the network, thus becoming inefficient and slow in data transfer and communication among the different nodes.

SUMMARY OF THE INVENTION

In general, a communications system may comprise a plurality of mobile communications nodes operating according to a current topology and reconfigurable to a new topology. Each mobile communications node may comprise a wireless transceiver, and a controller coupled to the wireless transceiver and configured to transmit spectral performance data to a plurality of adjacent nodes, receive spectral performance data from the plurality of adjacent nodes, identify a plurality of potential topologies for the plurality of adjacent nodes based on the spectral performance data, select a subset of potential topologies from among the plurality of potential topologies, generate a respective performance score for each potential topology of the subset of potential topologies, and switch to a new topology from among the subset of potential topologies based upon the performance scores.

The controller may be configured to switch to the new topology further based upon whether the performance score of the new topology exceeds the performance score of the current topology by a hysteresis value. In an example, the spectral performance data may comprise energy per bit to noise power spectral density ratio ($E_b/N_0$). The controller may be configured to select the subset of potential topologies comprising a plurality of random topologies. The controller may be configured to select the subset of potential topologies comprising likely topologies. The controller may also be configured to select respective operating frequencies for the potential topologies.

In an example embodiment, the wireless transceiver may comprise a code division multiple access (CDMA) transceiver. The controller may be configured to generate the respective performance scores based on at least one performance metric, which may comprise at least one of fragmented nodes, number of connected nodes, and data rate.

Another aspect is directed to a method for operating a mobile communications node within a communications system that may comprise a plurality of mobile communications nodes operating according to a current topology and reconfigurable to a new topology. The method may comprise operating a controller of the mobile communications node to transmit spectral performance data to a plurality of adjacent nodes, receive spectral performance data from the plurality of adjacent nodes, identify a plurality of potential topologies for the plurality of adjacent nodes based on the spectral performance data, select a subset of potential topologies from among the plurality of potential topologies, generate a respective performance score for each potential topology of the subset of potential topologies, and switch to a new topology from among the subset of potential topologies based upon the performance scores.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
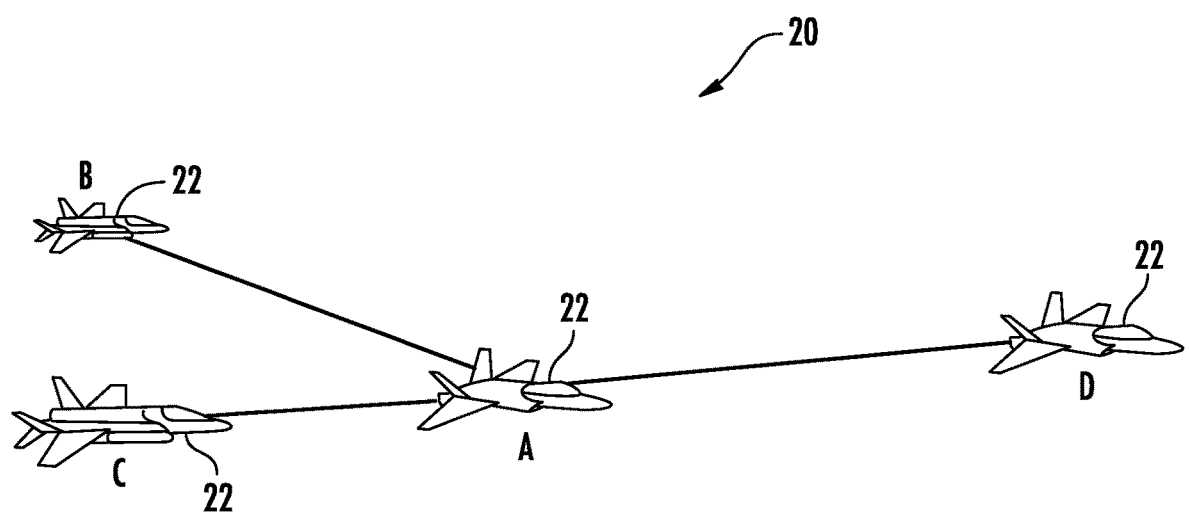
FIG. 1 is a high-level, simplified diagram of a communications system showing a plurality of mobile communications nodes that may be reconfigurable to a new topology in accordance with a non-limiting example.

Referring initially to FIG. 1, a communications system is illustrated generally at 20 showing a plurality of mobile communications nodes 22 operating according to a current topology and reconfigurable to a new topology. In this simplified example, four mobile communications nodes 22 are illustrated and labeled A, B, C and D. Each mobile communications node 22 is illustrated as an aircraft, but each mobile communications node could instead be an automobile, a train, a ship, passengers with mobile phones, or a combination of such nodes. In this example, some mobile communications nodes 22 may be physically closer to each other than other mobile communications nodes, but the respective distances that are illustrated in FIG. 1 may be the signal-to-noise ratio (SNR) distance. Although the communications system 20 is shown with each mobile communications node 22 being in a direct line-of-sight with each other, such as air-to-air communications as illustrated, or direct air-to-sea or air-to-ground communications, the line-of-sight direct communications is not a requirement and some of the mobile communications nodes may not be in a direct line-of-sight communication with other mobile communications nodes.

In an example, each mobile communications node 22 may communicate using a frequency division duplexing (FDD) protocol, allowing uplink and downlink transmissions at the same time, but over different frequency bands, allowing frequency agility in an example 400 MHz band with multiple different channels using a spread spectrum, code division multiple access (CDMA) communications protocol. The bandwidth in which each mobile communications node 22 may operate may be as wide as 400 MHz, but separate radio frequency (RF) channels may be about 40 MHz per channel.

Figure 2:
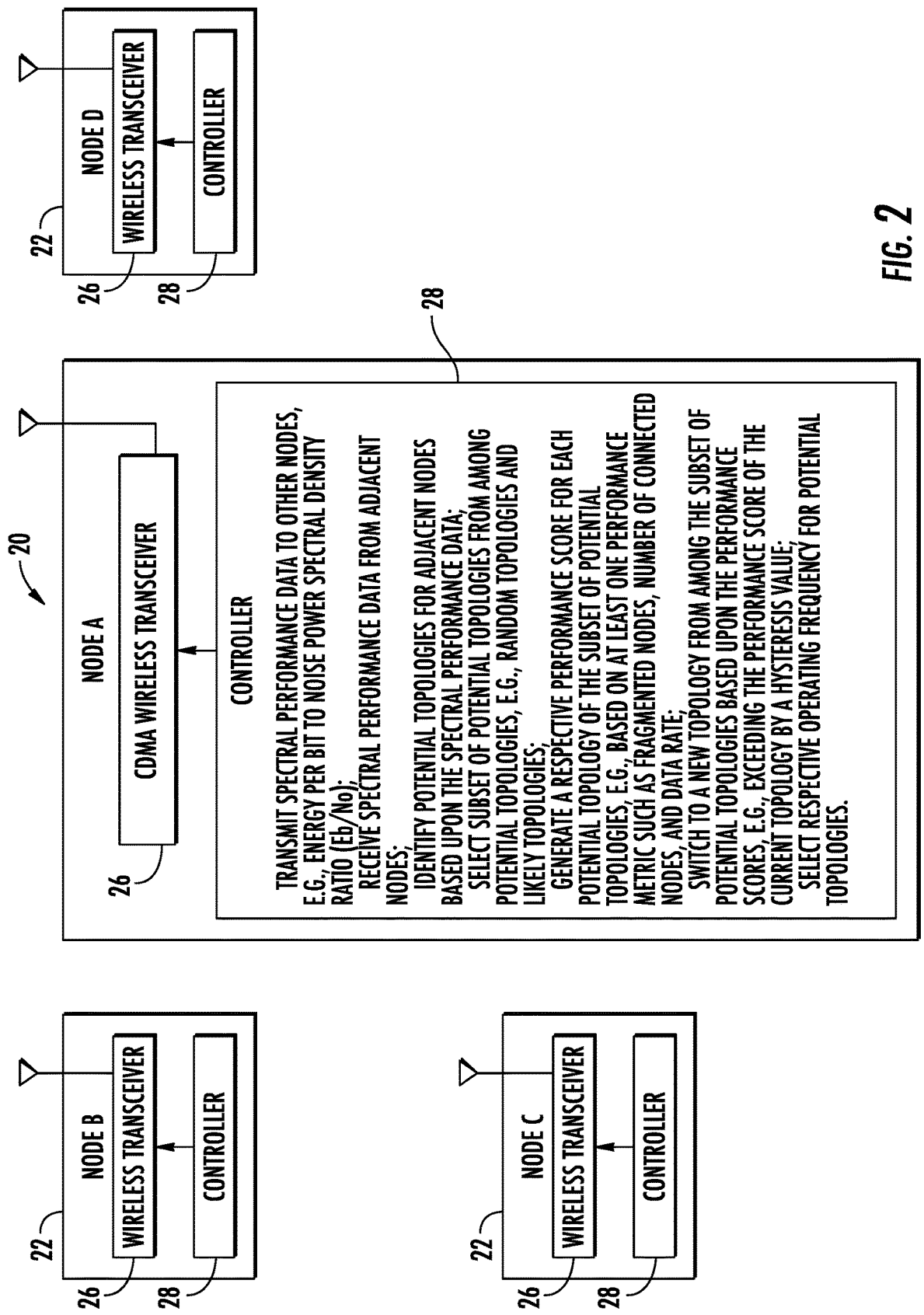
FIG. 2 is a block diagram showing greater details of the communications system of FIG. 1.

Referring now to the more detailed block diagram of FIG. 2, greater details are illustrated of the communications system 20 that includes the plurality of mobile communications nodes 22 operating in a current topology and shown as nodes A, B, C and D and reconfigurable to a new topology. Each mobile wireless communications node 22 includes a wireless transceiver 26, which may be formed as a CDMA transceiver, and a controller 28 that is configured to transmit spectral performance data to a plurality of adjacent nodes and receive spectral performance data from the plurality of adjacent nodes. The controller 28 may be provided by one or more processors and associated memories.

Adjacent mobile wireless communications nodes 22 may be discovered such that the spectral performance data can be transmitted and received using a dynamic multi-channel power management system for discovering neighboring nodes, such as disclosed in U.S. Pat. No. 10,652,806, the disclosure which is hereby incorporated by reference in its entirety. The system described in the '806 patent employs a probe signal and a traffic channel transmitting user data with the probe signal to locate new nodes to add to the network and modify power in a probe signal such that the neighboring nodes may be identified.

Figure 3A:
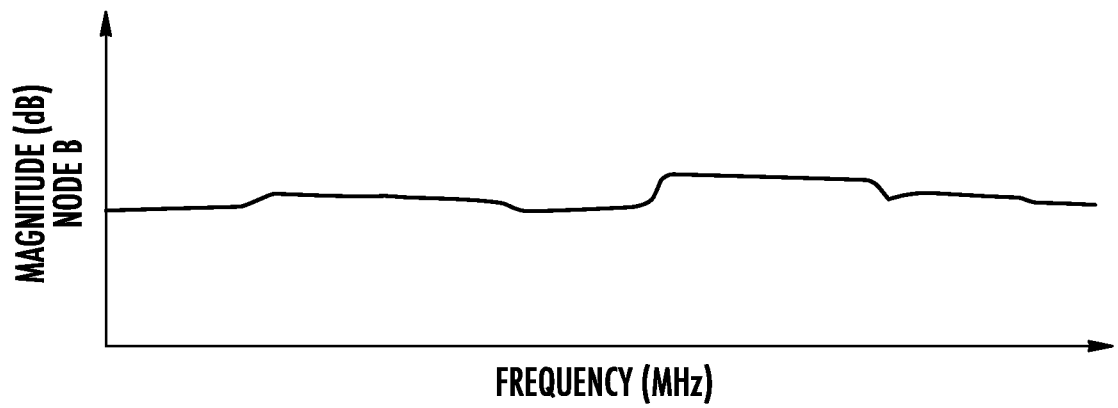
FIG. 3A is a graph showing an example of the magnitude versus frequency for the received spectral performance data transmitted from node B to node A in the communications network of FIGS. 1 and 2.
Figure 3B:
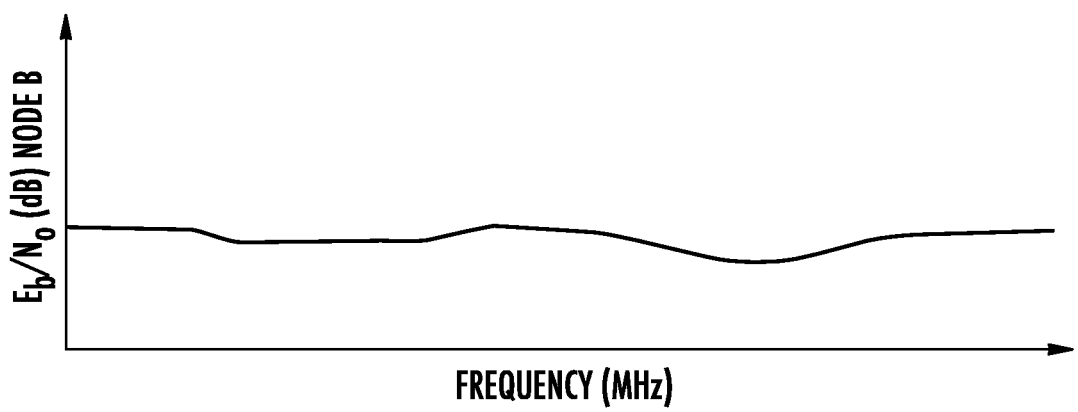
FIG. 3B is a graph showing the predicted energy per bit to noise power spectral density ratio ($E_b/N_0$) versus frequency for node B based on the received spectral performance data shown in FIG. 3A.
Figure 3C:
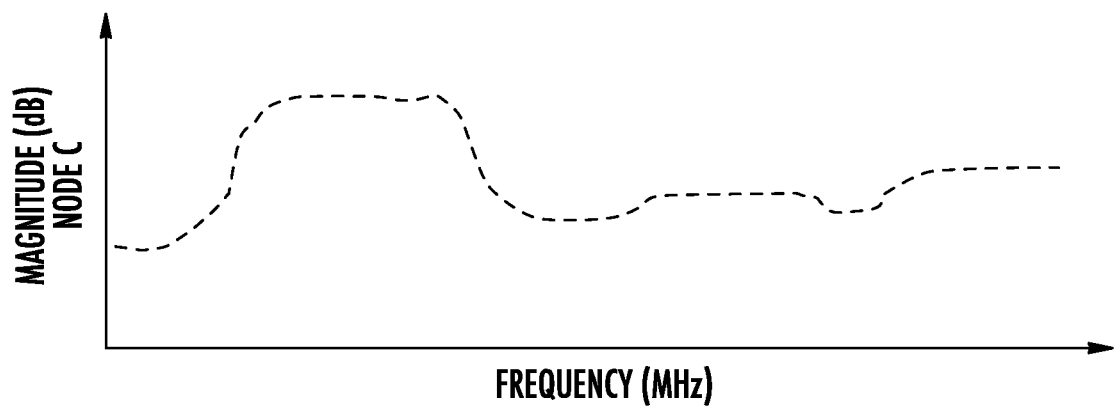
FIG. 3C is a graph similar to FIG. 3A but showing the example results for node C to node A.
Figure 3D:
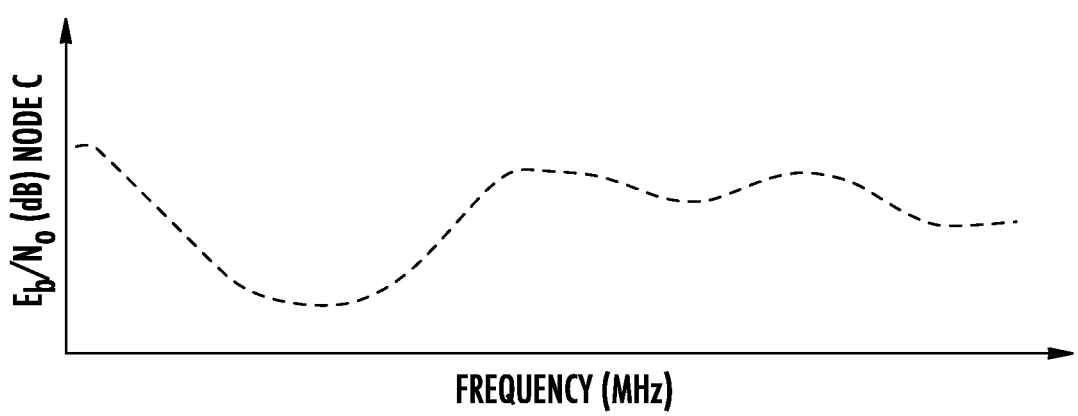
FIG. 3D is a graph similar to FIG. 3B but showing the predicted $E_b/N_0$ versus frequency for node C.
Figure 3E:
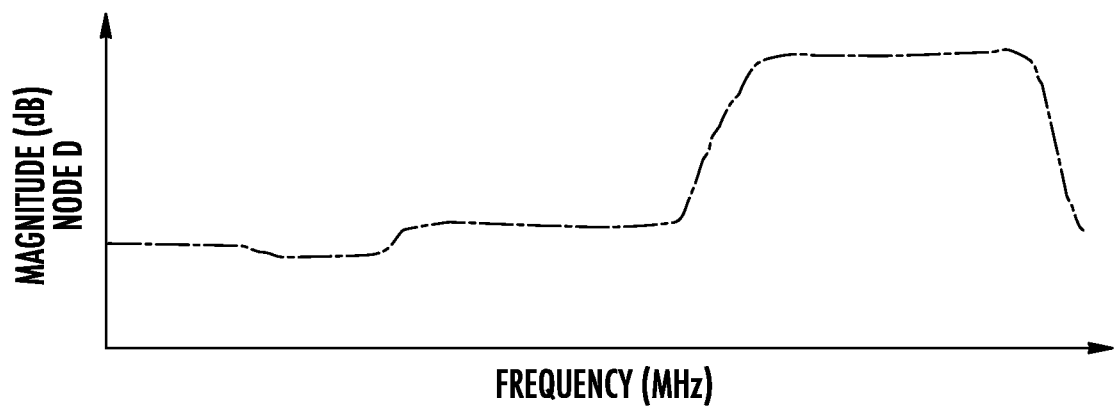
FIG. 3E is a graph similar to FIG. 3A but showing the example results for node D.
Figure 3F:
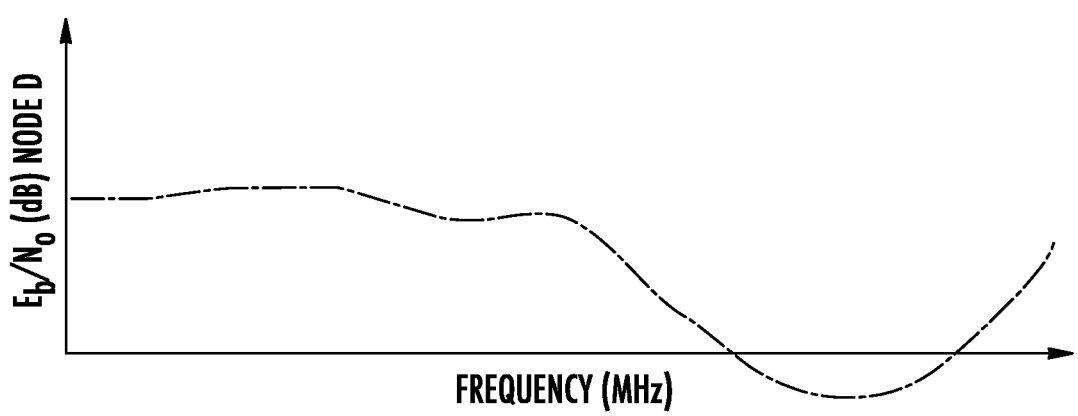
FIG. 3F is a graph similar to FIG. 3B showing the $E_b/N_0$ versus frequency for node D.

Reference is now made to the graphs of FIGS. 3A, 3C and 3E that illustrate examples of the magnitude in decibels versus frequency for the spectral performance data of the three mobile communications nodes labeled node B, node C, and node D in FIGS. 1 and 2 as received by node A. For example, FIG. 3A illustrates the graph of the magnitude of the received signal in decibels versus frequency received by node A from node B for the spectral performance data. This received signal strength across the frequency band for node B is used by node A to predict the energy per bit to noise power spectral density ratio ($E_b/N_0$) versus the frequency across the band. The $E_b/N_0$ is a normalized signal-to-noise (SNR) ratio measure, also known as the SNR per bit. Similar estimations are made based on the magnitude of the received signal versus frequency for the spectral performance data for nodes C and D, shown in the graphs of respective FIGS. 3C and 3E, and the predicted $E_b/N_0$ versus frequency across the band is shown in the graphs of FIGS. 3D and 3F for respective nodes C and D.

In an example, the spectral environment can be reported as spectral performance data from each of nodes B, C and D to allow node A to establish a traffic connection by receiving a message that contains the spectral power measurements and a signal-to-total-power ratio estimate that is related to the post excision $E_b/N_0$. For example, the spectral power may be measured with a real-time Fast Fourier Transform (FFT) circuit and power averaged over an interval.

Figure 4:
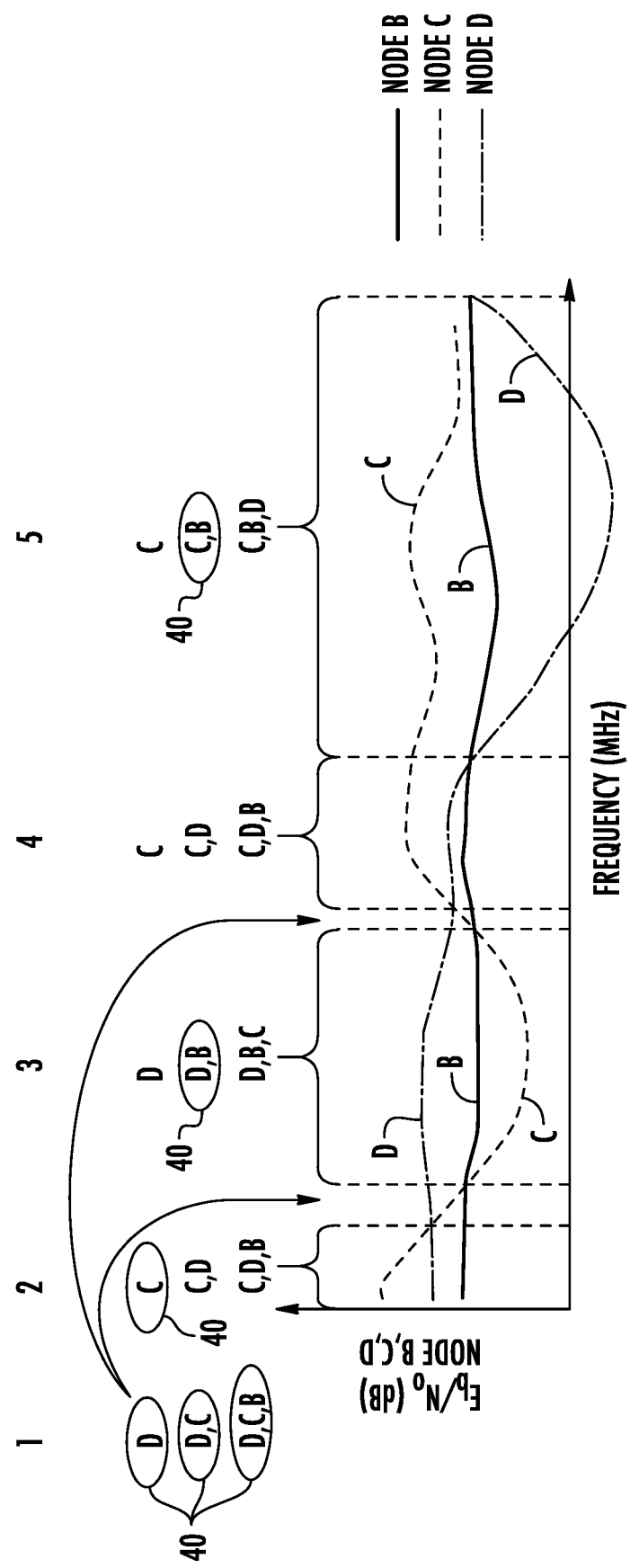
FIG. 4 is a graph showing potential topologies identified for the communications system of FIGS. 1 and 2 using the predicted $E_b/N_0$ versus frequency shown in the graphs of FIGS. 3B, 3D and 3F.

After the mobile communications node 22 corresponding to node A receives the spectral performance data from the plurality of adjacent nodes, in this example nodes B, C and D, a plurality of potential topologies are identified for these adjacent nodes based on the spectral performance data. An example of potential topologies is shown in the topologies that are identified in this simple three-node scenario for nodes B, C and D in the example of the graph in FIG. 4 that is determined by the superimposed graphs taken from FIGS. 3B, 3D and 3F, showing the overlap of the predicted $E_b/N_0$ versus frequency for each of the respective nodes B, C and D. The order of the nodes in terms of $E_b/N_0$ does not matter within a potential topology, although the order does determine which node would be selected for a potential topology that does not include all of the nodes. For example, if node B, C, and D had corresponding $E_b/N_0$ values in descending order, then the following sets of nodes would be candidate topologies: {B}, {B, C}, {B, C, D}. This convention exists due to the fact that if node A were to adjust its power and rate for a given node, then all of the nodes with higher corresponding $E_b/N_0$ would also be able to receive the signal. Note that the respective graph lines for each of nodes B, C, and D are labeled B, C, and D.

The crossing points of curves are shown by the vertical dashed lines and are indicative of a change in order of which graph line has the higher $E_b/N_0$. These crossing points are used to determine the regions of interest and are shown to identify the unique topologies, which are circled in this example and identified by the reference numeral 40. These circled topologies 40 are a subset of potential topologies from among the plurality of potential topologies shown in FIG. 4. For example, the representative subset shown by the circled potential topologies 40 in FIG. 4 of potential topologies from among all the listed potential topologies include node A communicating with only node D, or node A communicating with nodes D and C, or node A communicating with nodes D, C and B as indicated by the three circled node groupings in the first column in the left hand side of the graph of FIG. 4 corresponding to three unique topologies as part of the subset. As shown in the second column of potential topologies, node A may communicate with node C alone as a fourth unique topology, and thus becomes part of the subset of potential topologies with nodes D and D, C and D, C, B. In the fifth potential topology of the subset shown in the third column, node A may communicate with node D and node B as the fifth unique topology in the subset. In the sixth potential topology in the subset shown in the fifth column, node A may communicate with nodes C and B.

It is possible to limit the number of topologies to evaluate. For example, generally the current topology may be evaluated, followed by likely topologies and then randomly selected topologies. A maximum of N topologies may be selected to evaluate each period, for example, such as N=10. The topologies selected for evaluation as the subset of potential topologies in a given period may be referred to as candidate topologies. Once the candidate topologies are selected, a respective performance score is generated for each of the candidate topologies. The performance score could be based on at least one performance metric, which in non-limiting examples, may be at least one of fragmented nodes, number of connected nodes, and data rate.

Each of the potential topologies has a frequency where its worst-case predicted $E_b/N_0$ is maximized. A current topology may be evaluated at its best frequency, which can be changed using a system where the spectral information and relative power estimates are sent via messages, and $E_b/N_0$ feedback is sent via another message to arrive at an estimation. Likely topologies may have a perfect score for at least one metric and some portion of the N candidate topologies may be allotted to likely topologies (e.g., 5). Topologies other than the current topology and likely topologies may be selected at random to be candidate topologies to bring the total number of candidate topologies to N (e.g., 4 random topologies). If the total number of candidate topologies allocated to likely topologies exceeds the allotment (e.g., ≥5), then it is possible to rotate through the likely topologies in such a way that all of the likely topologies will be evaluated before revisiting a likely topology that was already evaluated. In like manner, if the total number of potential topologies that are not the current topology or likely topologies is greater than the number of candidate topologies allocated to randomly selected topologies (e.g., ≥4), then it is possible to rotate through the topologies that are randomly selected such that all of the topologies will be evaluated before duplication.

The candidate topologies that are not likely topologies or the current topology may be randomly selected in some embodiments. These topologies are taken from the potential topologies (e.g., highlighted topologies shown in FIG. 4) that are not identified as likely topologies or the current topology. Selecting random topologies permits the controller 28, such as at node A, to help evaluate all topologies over time if necessary. In an example, the selection of random topologies may be from those potential topologies that have not yet been evaluated. With randomly selected topologies, the controller 28, such as at node A, may keep track of the last time each topology was evaluated and prioritize less recent topologies, to guarantee that all topologies may be evaluated over time.

In an example where data rate is used as one of the metrics, a topology may be graded based on the maximum achievable data rate associated with an evaluated topology. For example, if the maximum achievable rate is less than or equal to 250 kbps, then the score is 0.1. If the maximum achievable rate is between 250 kbps and 1 Mbps, then the score is 0.5. Otherwise the score is 1.

In an example where the number of connected nodes is used as one of the metrics, a topology may be graded based on the number of nodes to which the local node connects. For example, if the number of connected nodes is 1, then the score is 0.25. If the number of connected nodes is 2, then the score is 0.5. If the number of connected nodes is 3, then the score is 0.75. If the number of connected nodes is 4 or more, then the score is 1.

In an example of the fragmented nodes as one of the metrics, a topology may be graded based on the number of fragmented nodes that result from a lack of connections associated with an evaluated topology. For example, as a baseline, a topology with all potential neighboring mobile communications nodes 22 may receive full points. A fragmented node may be defined as a node that it is no longer connected to the local node's network as a result of the local node not selecting a topology that includes all potential neighboring nodes. That node 22 is in a network fragment. This definition may extend to the known neighboring mobile communications nodes 22, if any, of the fragmented node. For example, if there are two known neighbors of the fragmented node, then three nodes may be fragmented as a result of the local node not making a connection.

As a non-limiting example of the scoring function, "n" may be the number of fragmented mobile communications nodes 22 for a given topology decision. The scoring function may be somewhat arbitrary. An example of a scoring function may be the case where the result is 1 when n=0, and the result is 0 when n is greater than 0.

Once a respective performance score is generated for each potential topology of that subset of potential topologies, the communications system 20 switches to a new topology from among that subset of potential topologies based on the performance scores. In an example, the switch to the new topology may be further based upon whether the performance score of the new topology exceeds the performance score of the current topology by a hysteresis value, such as a percentage of the derivation, which could be 5% in a non-limiting example. After a topology change, there may be some settling time to allow the wireless communications connections to form among the mobile communications nodes 22, which in the example of FIGS. 1 and 2 are nodes A, B, C and D. A local mobile communications node 22 may still react to sudden changes in interference during the settling time.

Figure 5:
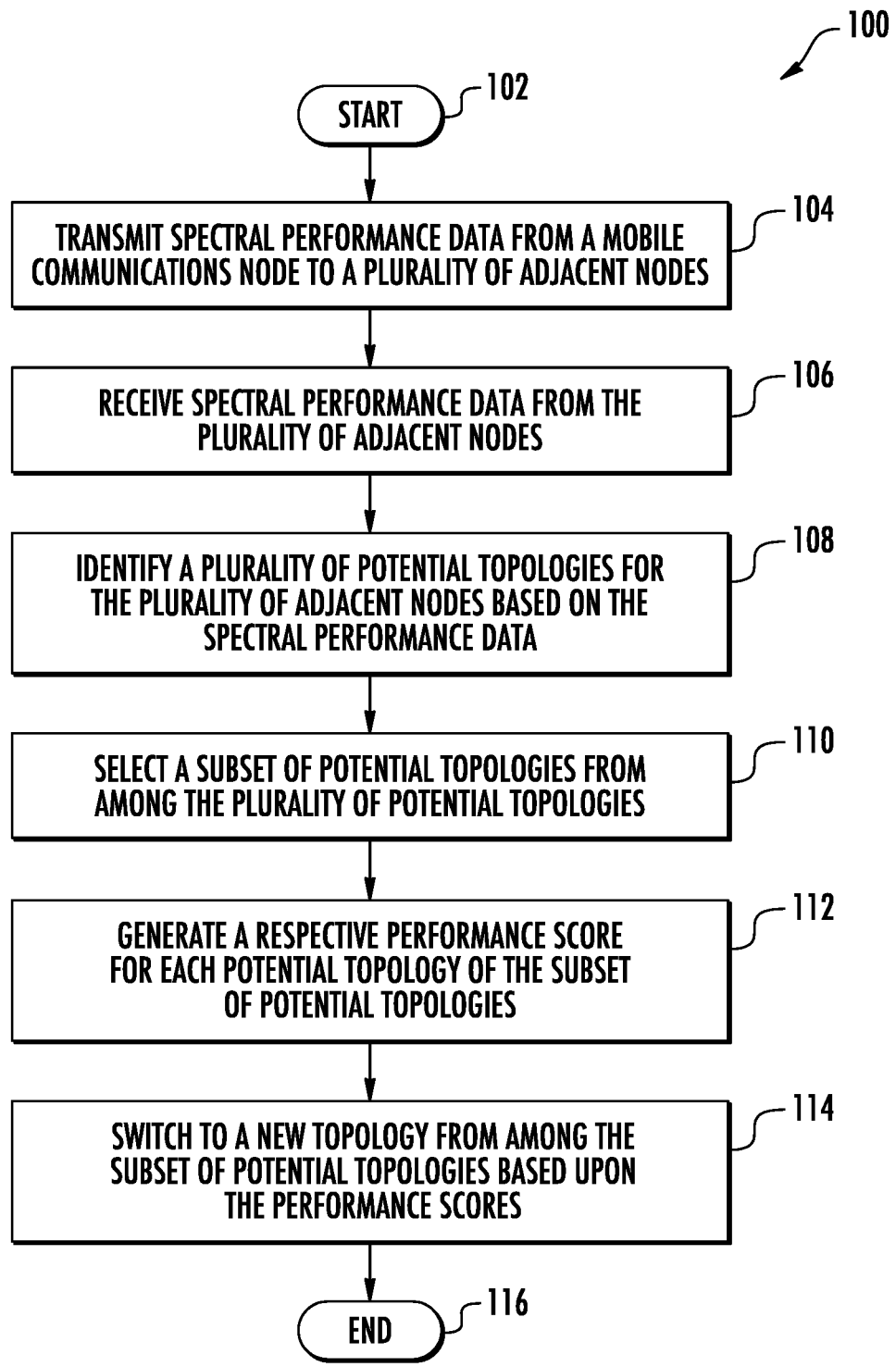
FIG. 5 is a high-level flowchart showing an example of operating a mobile communications node with the communications system of FIGS. 1 and 2.

Referring now to FIG. 5, a high-level flowchart is illustrated at 100 and shows a method for operating a mobile communications node 22 within the communication system 20 that includes a plurality of mobile communication nodes operating according to a current topology and reconfigurable to a new topology. The process starts (Block 102) and the controller 28 of a mobile communications node 22 transmits spectral performance data from the mobile communications node to a plurality of adjacent nodes (Block 104). The spectral performance data is received from the plurality of adjacent mobile communications nodes 22 (Block 106) and a plurality of potential topologies are identified for the plurality of adjacent nodes based on the spectral performance data (Block 108). A subset of potential topologies is selected from among the plurality of potential topologies (Block 110) and a respective performance score generated for each potential topology of the subset of potential topologies (Block 112). The controller 28 switches to a new topology from among the subset of potential topologies based upon the performance scores (Block 114). The process ends (Block 116).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A communications system comprising:
a plurality of mobile communications nodes operating according to a current topology and reconfigurable to a new topology, each mobile communications node comprising
a wireless transceiver, and
a controller coupled to the wireless transceiver and configured to
transmit spectral performance data to a plurality of adjacent nodes,
receive spectral performance data from the plurality of adjacent nodes over a frequency band,
generate a respective spectral performance curve for each adjacent node over the frequency band,
determine crossing points of the spectral performance curves over the frequency band,
identify a plurality of potential topologies for the plurality of adjacent nodes based on the spectral performance data and the crossing points, the potential topologies comprising operating frequencies within the frequency band,
select a subset of potential topologies from among the plurality of potential topologies,
generate a respective topology performance score for each potential topology of the subset of potential topologies, and
switch to a new topology from among the subset of potential topologies based upon the topology performance scores.

2. The communications system of claim 1 wherein the controller is configured to switch to the new topology further based upon whether the topology performance score of the new topology exceeds the topology performance score of the current topology by a hysteresis value.

3. The communications system of claim 1 wherein the spectral performance data comprises energy per bit to noise power spectral density ratio ($E_b/N_0$).

4. The communications system of claim 1 wherein the controller is configured to select the subset of potential topologies comprising a plurality of random topologies.

5. The communications system of claim 1 wherein the controller is configured to select the subset of potential topologies comprising likely topologies.

6. The communications system of claim 1 wherein the wireless transceiver comprises a code division multiple access (CDMA) transceiver.

7. The communications system of claim 1 wherein the controller is configured to generate the respective topology performance scores based on at least one performance metric.

8. The communications system of claim 7 wherein the at least one performance metric comprises at least one of fragmented nodes, number of connected nodes, and data rate.

9. A mobile communications node for a communications system comprising a plurality of mobile communications nodes operating according to a current topology and reconfigurable to a new topology, the mobile communications node comprising:
a wireless transceiver; and
a controller coupled to the wireless transceiver and configured to
transmit spectral performance data to a plurality of adjacent nodes,
receive spectral performance data from the plurality of adjacent nodes over a frequency band,
generate a respective spectral performance curve for each adjacent node over the frequency band,
determine crossing points of the spectral performance curves over the frequency band,
identify a plurality of potential topologies for the plurality of adjacent nodes based on the spectral performance data and the crossing points, the potential topologies comprising operating frequencies within the frequency band,
select a subset of potential topologies from among the plurality of potential topologies,
generate a respective topology performance score for each potential topology of the subset of potential topologies, and
switch to a new topology from among the subset of potential topologies based upon the topology performance scores.

10. The mobile communications node of claim 9 wherein the controller is configured to switch to the new topology further based upon whether the topology performance score of the new topology exceeds the topology performance score of the current topology by a hysteresis value.

11. The mobile communications node of claim 9 wherein the spectral performance data comprises energy per bit to noise power spectral density ratio ($E_b/N_0$).

12. The mobile communications node of claim 9 wherein the controller is configured to select the subset of potential topologies comprising a plurality of random topologies.

13. The mobile communications node of claim 9 wherein the controller is configured to select the subset of potential topologies comprising likely topologies.

14. The mobile communications node of claim 9 wherein the wireless transceiver comprises a code division multiple access (CDMA) transceiver.

15. The mobile communications node of claim 9 wherein the controller is configured to generate the respective performance scores based on at least one performance metric.

16. The mobile communications node of claim 15 wherein the at least one performance metric comprises at least one of fragmented nodes, number of connected nodes, and data rate.

17. A method for operating a mobile communications node within a communications system comprising a plurality of mobile communications nodes operating according to a current topology and reconfigurable to a new topology, the method comprising:
   operating a controller of the mobile communications node to
      transmit spectral performance data to a plurality of adjacent nodes,
      receive spectral performance data from the plurality of adjacent nodes over a frequency band,
      generate a respective spectral performance curve for each adjacent node over the frequency band,
      determine crossing points of the spectral performance curves over the frequency band,
      identify a plurality of potential topologies for the plurality of adjacent nodes based on the spectral performance data and the crossing points, the potential topologies comprising operating frequencies within the frequency band,
      select a subset of potential topologies from among the plurality of potential topologies,
      generate a respective topology performance score for each potential topology of the subset of potential topologies, and
      switch to a new topology from among the subset of potential topologies based upon the topology performance scores.

18. The method of claim 17 wherein operating the controller to switch to the new topology is further based upon whether the topology performance score of the new topology exceeds the topology performance score of the current topology by a hysteresis value.

19. The method of claim 17 wherein the spectral performance data comprises energy per bit to noise power spectral density ratio ($E_b/N_0$).

20. The method of claim 17 wherein the subset of potential topologies comprises a plurality of random topologies.

21. The method of claim 17 wherein the subset of potential topologies comprises likely topologies.

* * * * *